United States Patent [19]

Tsuda et al.

[11] 4,025,436
[45] May 24, 1977

[54] LIQUID TREATMENT APPARATUS

[75] Inventors: Nobuaki Tsuda; Kenji Inagaki; Tamotu Imamiya, all of Fuji; Kunio Ohno, Tokyo; Yoshiyuki Mizoguchi, Ohita, all of Japan

[73] Assignee: Asahi Kasei Kogyo Kabushiki Kaisha, Osaka, Japan

[22] Filed: Sept. 5, 1975

[21] Appl. No.: 610,829

[30] Foreign Application Priority Data

Sept. 7, 1974 Japan ............................ 49-103127
Nov. 1, 1974 Japan ............................ 49-132957

[52] U.S. Cl. ........................................ 210/321 A
[51] Int. Cl.² ........................................ B01D 31/00
[58] Field of Search ..................... 210/22, 23, 321

[56] References Cited

UNITED STATES PATENTS

| | | | |
|---|---|---|---|
| 3,276,996 | 10/1966 | Lazare | 210/22 |
| 3,526,001 | 8/1970 | Smith | 210/321 X |
| 3,884,814 | 5/1975 | Vogt et al. | 210/321 |

*Primary Examiner*—Frank A. Spear, Jr.
*Attorney, Agent, or Firm*—Armstrong, Nikaido & Marmelstein

[57] ABSTRACT

A liquid treatment apparatus which can perform dialysis at a very high efficiency and which is suitable for dialysis of human blood is provided. The apparatus comprises a bundle of a vast plurality of semi-permeable hollow fibers substantially equal in length, which is gathered and bonded only at both end portions thereof. An inside liquid is permitted to flow the interior of the individual hollow fibers. This bundle of hollow fibers is loosely suspended in a vessel having a substantially U-shaped passage for an outside liquid, and the two gathered and bonded portions of the fiber bundle are connected to the vessel at two spaced-apart openings formed on the top face of the vessel. A dialyzate flowing outside the hollow fibers is introduced from an introduction opening formed in the bottom face of the vessel. In this apparatus, because the hollow fibers are suspended in the vessel loosely in an appropriately expanded state, the flow rate of the outside liquid flowing outside the hollow fibers can be increased while maintaining good contact with the suface of the fibers, and therefore, the treatment time can be drastically shortened. Especially good results are obtained when this apparatus is used as an artificial kidney for the cleaning of human bloods.

14 Claims, 16 Drawing Figures

LIQUID TREATMENT APPARATUS

BACKGROUND OF THE INVENTION

This invention relates to a liquid treatment apparatus comprising semi-permeable hollow fibers which have continuous hollow chambers (hereinafter referred to as "hollow fibers") in which exchange or transfer of substances is performed between a liquid flowing inside the hollow fibers (hereinafter referred to as "inside liquid") and liquid flowing outside the hollow fibers (hereinafter referred to as "outside liquid") through the semi-permeable membrane of the hollow fibers. More particularly, this invention relates to a liquid treatment apparatus which is especially effective for shortening the treatment time by increasing the flow rate of the outside liquid. Further, when this apparatus is used for passing blood through the interior of the fibers in the manner such as that employed in the conventional coil-type artificial kidney dialysis apparatus, including a semi-permeable tube wound in a coil-like shape, an excellent blood-cleaning effect can be attained.

There is known in the art a liquid treatment apparatus comprising a vast plurality of semi-permeable hollow fibers (for example about ten thousand hollow fibers) arranged and gathered in parallel relationship to one another in a cylindrical bundle, a cylindrical vessel having an introduction opening and a discharge opening for an outside liquid, said bundle of hollow fibers being arranged in a straight line within said vessel without disturbing the parallel relationship among the fibers, supporting and partitioning members for the hollow fibers, which members are formed by filling in a liquid tight manner only at both end portions of the hollow fibers an adhesive in the spaces among the hollow fibers and between the hollow fibers and the walls of said vessels to thereby prevent the inside liquid from mingling directly with the outside liquid without passing through the semi-permeable membrane of the hollow fibers, and an inlet and an outlet for the inside liquid, which communicate with the terminal ends of the fiber bundle, respectively.

In a conventional dialysis apparatus of this type, however, because a vast plurality of hollow fibers are gathered in a relatively high density, it is almost impossible for the outside liquid to pass uniformly all of the clearances between every two adjacent fibers, and in some parts, the outside liquid does not flow sufficiently but is stagnant. Accordingly, some parts of surfaces of the membrane are not sufficiently utilized for dialysis and the merit attained by use of hollow fibers, namely the merit that the effective surface area of the membrane per unit vessel volume is large, is not fully realized. In fact, no commercially sufficient result has been obtainable when the exchange or transfer of substances is conducted through the semi-permeable membrane of the conventional apparatus.

Even when it is intended to provide sufficient clearances among hollow fibers so as to eliminate the foregoing defect, there is brought about another defect in that the capacity of the vessel must inevitably be increased, and furthermore, it is technically difficult to dispose equidistantly fine hollow fibers with sufficient clearance between adjacent fibers. Especially, when an attempt is made to use this apparatus as an artificial kidney by passing blood in the interior hollow portions of the fibers, the size of the blood inlet and outlet formed at the terminal ends of the fiber bundle should invitably be increased in proportion to the increased volume of the vessel and it often happens that blood taken out of the body of patient exceeds the critical volume of the vessel during the blood-cleaning treatment and therefore, difficulties are involved in using this apparatus as an artificial kidney.

Moreover, in the above-mentioned conventional apparatus, since a vast plurality of hollow fibers are gathered relatively closely and packed tightly in the cylindrical vessel, it is difficult to increase the flow rate of the outside liquid, and if the flow rate of the outside liquid is increased by force, the fluid flows only through portions where it can flow with ease. Accordingly, it has been impossible to shorten the treatment time by this conventional apparatus.

We made various research efforts and experiments and have succeeded in developing an apparatus in which the capacity of transfer of substances through a semi-permeable membrane of hollow fibers can be greatly increased without reducing the merit of the use of hollow fibers, namely the merit that the apparatus capacity can be reduced.

SUMMARY OF THE INVENTION

According to the present invention, there is provided a liquid treatment apparatus which comprises: (a) a vessel having a top and bottom face connected by a sidewall structure, (1) said top face having two spaced-apart openings, (2) said bottom face having at least one opening for introducing an outside flowing liquid, (3) an upper portion of said vessel, including said top face and part of said sidewall structures, having a plurality of openings for discharging said outside flowing liquid, (4) the interior of said vessel being constructed and arranged so as to form a U-shaped passage, the terminal ends of which terminate at said two spaced-apart openings, respectively; (b) a bundle of semi-permeable hollow fibers substantially equal in length suspended within said U-shaped passage, (1) one of the end portions of the bundle of fibers being gathered and bonded in liquid tight connection to form a first fixation block and the other of the end portions of the bundle of fibers being gathered and bonded in liquid tight connection to form a second fixation block, said first and second fixation blocks being fixed to said vessel, in liquid tight connection, at its two spaced-apart openings, respectively, (2) the unbonded portion of the bundle of fibers being suspended in a manner for permitting free expansion upon contact with said outside flowing liquid, thereby permitting the outside flowing liquid to flow freely between the unbonded portions of the individual fibers and providing intimate contact between the surface of the fibers and the outside flowing liquid; and (c) an inlet and an outlet for introducing and discharging an inside flowing liquid, arranged in an adjacent relationship with said two spaced-apart openings of the vessel and communicating with the terminal ends of the bundle of the fibers, respectively, thereby permitting the inside flowing liquid to flow through the interior of the individual hollow fibers.

The apparatus of this invention is characterized in that a vast plurality of semi-permeable hollow fibers substantially equal in length, which are gathered and bonded together only at both end portions thereof, are loosely suspended in a vessel having a substantially U-shaped passage and an outside liquid is introduced from the lower face of a horizontal portion of the U- shaped passage. This apparatus can be applied in the fields in which a semi-permeable membrane is generally used, for example, dialysis, ultrafiltration, osmosis and reverse osmosis.

In the apparatus of this invention, since a vast plurality of fine hollow fibers are used, the hollow fibers can be gathered and bonded together very closely at both end portions and therefore the inlet and the outlet for the inside liquid can be made compact.

Further, in the apparatus of this invention, since a bundle of hollow fibers substantially equal in length, which are gathered and bonded only at both end portions thereof, are suspended in the vessel, the bundle of fibers are sufficiently expanded especially at the horizontal portion of the U-shaped passage and the contact between the fiber surface and the outside liquid is increased. Specifically when a bundle of fibers is disposed in a U-shaped configuration of a broad width, the length of the U-shape formed by a fiber present on the inside is shorter than the length of the U-shape formed by a fiber present on the outside. Accordingly when a bundle of fibers having the same length is disposed in a U-shaped configuration, it is physically impossible to keep all the fibers in parallel relationship to each other, and especially at the lower horizontal part of the U-shape, the fibers of necessity expand.

Still further, in the apparatus of this invention, a bundle of hollow fibers which are gathered and bonded only at both end portions thereof is suspended and the outside liquid is introduced from the lower surface of the horizontal portion of the fiber bundle which is arranged in a U-shaped configuration. Therefore in the horizontal portion of the U-shaped configuration which is positioned in the vicinity of the introduction opening for the outside liquid the hollow fibers suspended in the non-gathered and unbonded state are lifted upwardly by the force of the outside liquid and further the bundle is expanded, whereby the fibers can be intimately contacted with the outside liquid. In order to achieve this effect, if only one introduction opening is disposed for the outside liquid, it is necessary to position this opening at the center of the lower surface of the horizontal portion.

The above expansion of the bundle of the hollow fibers is appropriately confined by the inner wall face and the outer wall face of the substantially U-shaped passage. Accordingly, excessive expansion is prevented in the bundled fibers and undesired reduction of the contact effect can be prevented. In this invention, best results are obtained when the vertical width of the horizontal portion of the passage, for the outside liquid is slightly narrower than the width of the fiber bundle which would be attained if the inner passage wall of a U-shaped configuration were to be removed. If the width of the passage is wider than said width, when the entire fiber bundle is contacted with the inner passage wall in the horizontal portion of the U-shaped configuration, the outside liquid merely pushes upwardly and presses the bundle to the inner passage wall and the outside liquid will flow through the space formed below the fiber bundle without making intimate contact with the bundled fibers. The arrangement mentioned with respect to the vertical width in the horizontal portion of the U-shaped configuration of the passage for the outside liquid holds true also as regards the lateral width, and it is necessary that the lateral width of the outside liquid passage should be slightly narrower than the width of the fiber bundle which would be attained if the side walls of the passage were to be removed.

In the apparatus of this invention in which a bundle of hollow fibers is gathered and bonded only at both end portions thereof and suspended in a U-shaped configuration and the outside liquid is introduced from the lower face of the horizontal portion of the U-shaped configuration of the hollow fiber bundle, the force imposed on the fibers is much more reduced than in the case in which a bundle of fibers which are arranged in parallel relationship to one another and are gathered and bonded at both end portions thereof and linearly stretched and supported horizontally. Therefore, occurrence of troubles such as fiber breakages can be greatly reduced.

Moreover, in the apparatus of this invention, since fibers substantially equal in length are employed, the flow resistance to the inside liquid flowing through respective fibers and the difference in the pressure between the inlet and the outlet can be maintained at substantially the same level and the variation of the flow rate of the inside liquid among respective fibers can be reduced.

When baffle boards are disposed in the vicinity of the points where the fibers are gathered and bonded, the following advantage is attained. In general, in the upper portion of the fiber bundle, the state of permeation of the liquid is not good and sufficient treatment cannot be expected in this upper portion. This undesired phenomenon is prevented by provision of baffle boards. More specifically, when baffle boards are disposed in the above-mentioned manner, the outside liquid is allowed to pass through the interior of the fiber bundle uniformly with a high contact effect, and the treatment efficiency can be improved by 2 to 3% over the case where such baffle boards are not disposed.

DETAILED DESCRIPTION OF THE DRAWINGS

This invention will now be described in detail by reference to the accompanying drawings, in which.

Figure 1:
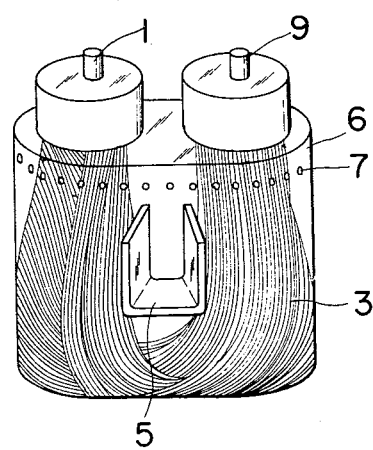
FIG. 1 is a perspective view of an embodiment of the apparatus of this invention, seen obliquely from above.
Figure 2:
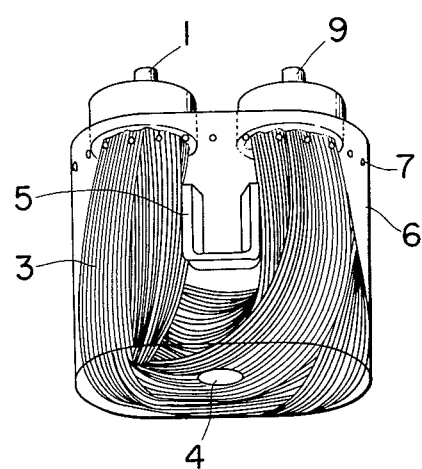
FIG. 2 is a perspective view of the apparatus of FIG. 1, seen obliquely from below.

In the apparatus shown in FIGS. 1 to 4, for better illustration of this invention, a transparent vessel 6 is shown in order that the structure inside the vessel 6 will readily be understood. In the vessel 6, a U-shaped guide plate 5 is disposed to form an inner side wall defining a substantially U-shaped passage for an outside liquid. This guide plate is bonded to the side wall of the vessel or molded integrally with the vessel. An introduction opening 4 for the outside liquid is formed in the lower portion of the vessel 6, and a relatively large of discharge openings 7 for the outside liquid are perforated on the upper portion of the side wall of the vessel 6. An inside liquid introduced from an inlet 1 passes through the interiors of a vast plurality of hollow fibers 3, is acted upon by the outside liquid through the semi-permeable membrane of the hollow fibers and then is removed through an outlet 9.

Figure 4:
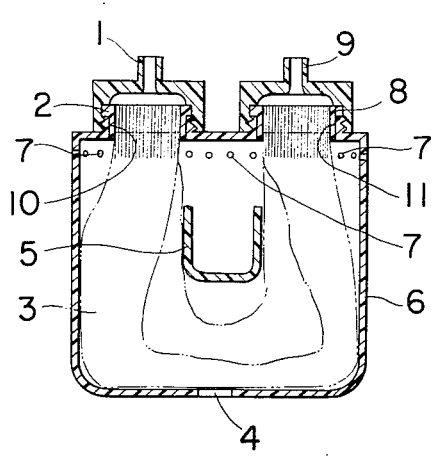
FIG. 4 is a sectional view taken along the line IV-IV in FIG. 3 in which the expansion of the bundle of the hollow fibers is indicated by two-dot chain lines.
Figure 5:
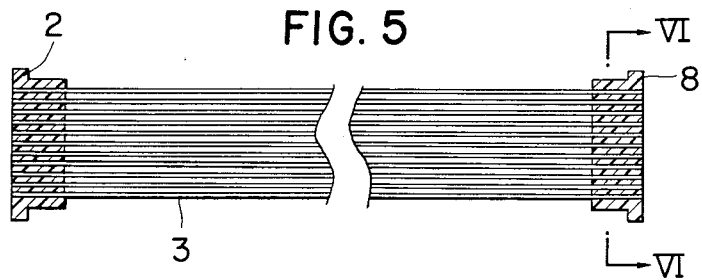
FIG. 5 is a sectional end view illustrating a bundle of hollow fibers gathered and bonded at both end portions thereof, which is used for the apparatus of this invention.
Figure 6:
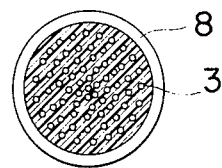
FIG. 6 is a sectional view taken along the line VI-VI in FIG. 5.

The method of suspending a bundle of hollow fibers will now be described by reference to FIGS. 5 and 6 illustrating a bundle of hollow fibers, and FIG. 4, showing a sectional view of the apparatus.

A vast plurality of semi-permeable hollow fibers 3 substantially equal in length are arranged in a bundle form so that the end faces of the respective fibers are trued up, and an adhesive is filled in spaces among the fibers at both end portions of the bundle so that interior hollow chambers of the fibers are not filled up, thereby forming fixation blocks 2 and 8. The thus formed bundle of the hollow fibers 3 is packed in two openings 10 and 11 arranged in spaced relationship on the top face of the vessel 6 so that the end faces of the hollow fibers are upwardly directed at the fixation blocks 2 and 8 of the fiber bundle, as shown in FIG. 4. Then, spaces between the solidified portions 2 and 8 and the inner walls of the openings 10 and 11 are filled up with an adhesive, whereby the bundle of hollow fibers is suspended in the vessel. At this point, it is important that spaces among respective hollow fibers and between the bundle of the hollow fibers and the inner walls of the opening 10 and 11 should be filled up with the adhesive to create a liquid tight condition so that mingling of the inside liquid and outside liquid is prevented in these bonded areas.

In the apparatus of this invention having the above structure, the hollow fibers 3 are sufficiently expanded in the lower portion of a substantially U-shaped passage for the outside liquid which is formed in the vessel 6. When the outside liquid flows into the vessel 6, the hollow fibers are permitted to have sufficient contact with the outside liquid and, at the same time, the hollow fibers are compactly gathered at both end portions thereof.

Figure 7:
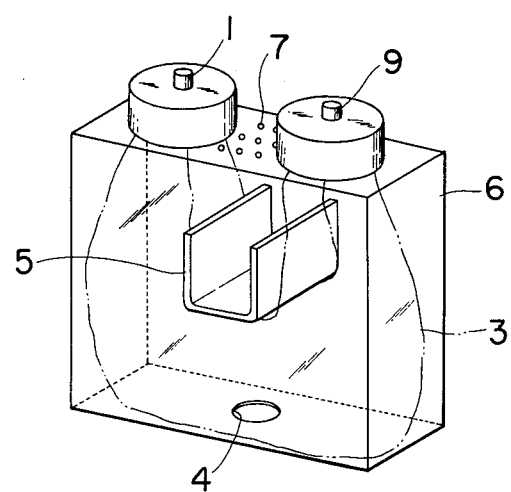
FIG. 7 is a perspective view illustrating another embodiment of the apparatus of this invention, in which expansion of the bundle of the hollow fibers is indicated by two-dot chain lines.
Figure 8:
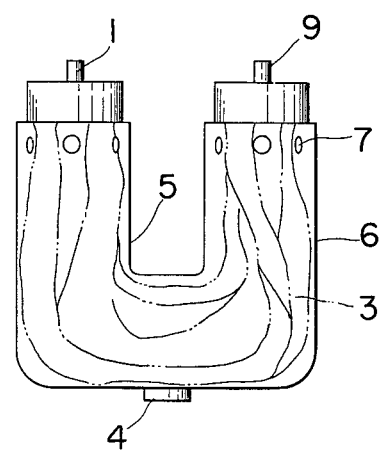
FIG. 8 is a front view illustrating a further embodiment of the apparatus of this invention, in which expansion of the bundle of the hollow fibers is indicated by two-dot chain lines.

FIG. 7 is a perspective view illustrating another embodiment of this invention where discharge openings 7 for the outside liquid are disposed on the top face of the vessel and one introduction opening is positioned at the center of the bottom face of the vessel 6, and FIG. 8 is a front view of another embodiment of the apparatus of this invention in which a vessel having a substantially U-shaped configuration is used as the vessel 6, both vertical portions of the U-shape are formed into cylinders, and the discharge openings 7 for the outside liquid are perforated on the upper portions of peripheral walls of these cylinders. In FIGS. 7 and 8, expansion of the bundle of hollow fibers disposed in the vessel 6 is indicated by two-dot chain lines.

An embodiment in which the apparatus of this invention is used as an artificial kidney will now be explained by reference to FIGS. 9 to 13.

A so-called coil type artificial kidney comprising a cylindrical core, the bottom of which is closed, a semi-permeable tube wound on the core in a cylindrical form together with a polyethylene mesh, and an inlet and an outlet for blood formed at both end portions of the tube, respectively, has heretofore been used. In actual applications, this artificial kidney apparatus is put in a large bath tank and a perfusion liquid, namely a dialyzate, flows into the vessel from the center of the bottom portion of the cylindrical core so that the perfusion liquid has the intended action on the surface of the wound tube.

Figure 9:
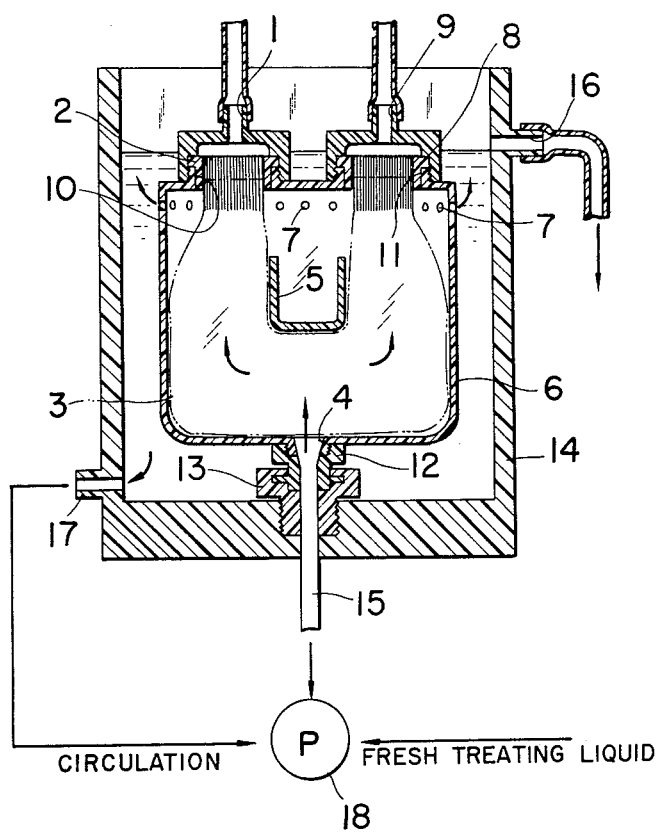
FIG. 9 is a sectional view illustrating a still further embodiment of the apparatus of this invention which is used as an artificial kidney of the coil type.

As is seen from FIG. 9, in order to prevent mingling of the outside liquid and inside liquid at openings 10 and 11 on the top face of the vessel 6, the fixation blocks 2 and 8 at both end portions of the bundle of hollow fibers 3 are fixed to caps 19 functioning as an inlet and an outlet for the inside liquid, respectively and being fastened to the vessel 6, whereby leakage of the inside liquid from the fixation blocks 2 and 8 is prevented. In this manner, the bundle of hollow fibers 3 is suspended in a substantially U-shaped passage for the outside liquid in the vessel 6, said passage being defined by a guide plate 5 constituting the inner wall of said passage. The thus constructed apparatus of the invention is secured by a fixing part 12 fastened to the introduction opening for the outside liquid (this fixing part 12 may be molded integrally with the vessel 6). Fixing part 12 has such a structure that it can be removably connected to a fixing fitting 13 described below and shown in FIG. 13.

The above described apparatus is put in a bath tank 14 for the above-mentioned conventional coil type artificial kidney, which is provided with the fixing fitting 13, and the apparatus is secured to the tank 14 by means of the fixing part 12 and the fixing fitting 13. A perfusion liquid used for an ordinary artificial kidney is introduced from an inlet pipe 15 disposed in the lower portion of the tank 14 and flows into the vessel 6. The perfusion liquid flows out from the discharge openings 7 of the vessel 6 and is stored in the tank 14, whereby spaces outside the hollow fibers in the vessel 6 of the liquid treatment apparatus of this invention are sufficiently filled with the outside liquid (the perfusion liquid in this embodiment). The bath tank 14 is designed so that a certain liquid level is maintained, and the perfusion liquid overflows from a perfusion liquid outlet 16 of the tank 14. In the tank 14, a perfusion liquid-circulating opening 17 is disposed to circulate the perfusion liquid, and the perfusion liquid from the opening 17 is mixed with a fresh perfusion liquid and recycled into the perfusion liquid inlet pipe 15 by means of a pump 18 while the temperature of the perfusion liquid is maintained at a constant level. Blood from a blood vessel of a patient suffering from a kidney trouble is passed through the apparatus and returned from the outlet 9 for the inside liquid (blood in this embodiment) to the blood vessel of the patient.

Figure 10:
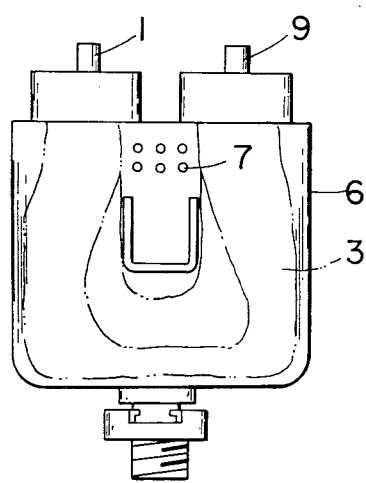
FIG. 10 is a front view of the apparatus shown in FIG. 9, in which a liquid is not filled, expansion of the bundle of the hollow fibers being indicated by two-dot chain lines.
Figure 11:
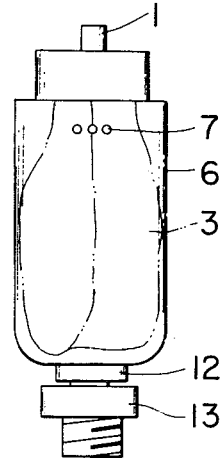
FIG. 11 is a side view of the apparatus shown in FIG. 10.

When no liquid is flowing through in the apparatus of this invention, the bundle of hollow fibers is present in the apparatus in such a state as illustrated in FIGS. 10 and 11, but when the outside liquid (the perfusion liquid in the embodiment shown in FIG. 9) flows through apparatus of this invention, the bundle of the hollow fibers is further expanded as is shown in FIG. 9, and the fibers can uniformly and efficiently receive the action of the perfusion liquid. Accordingly, a very high blood-cleaning effect can be attained in the apparatus of this invention.

Figure 12:
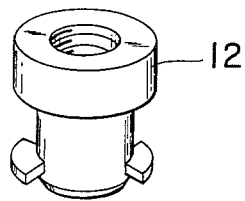
FIG. 12 is a perspective view of a part to be used for attaching the apparatus of this invention to an artificial kidney of the coil type.
Figure 13:
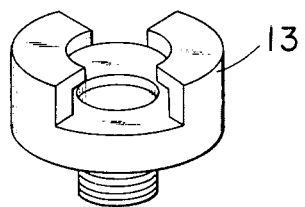
FIG. 13 is a perspective view of another part to be used for attaching the apparatus of this invention to an artificial kidney of the coil type.

The fixing part 12 shown in FIG. 12 can be connected to the fixing fitting 13 shown in FIG. 13 by placing the part 12 on the fitting 13 after rotating the part 12 by 90° and then rotating the apparatus including the part 12 by 90° again. Dismounting can be accomplished by performing the above procedure in a reverse order.

Figure 14:
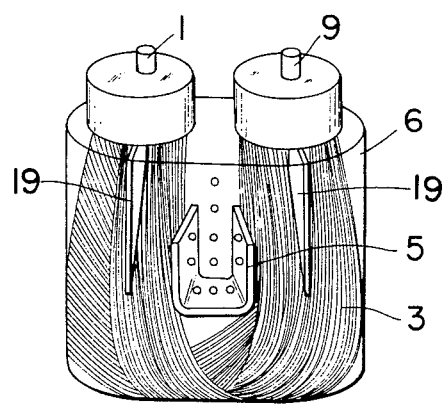
FIG. 14 is a perspective view of a still further embodiment of the apparatus of this invention in which baffle boards are provided.
Figure 15:
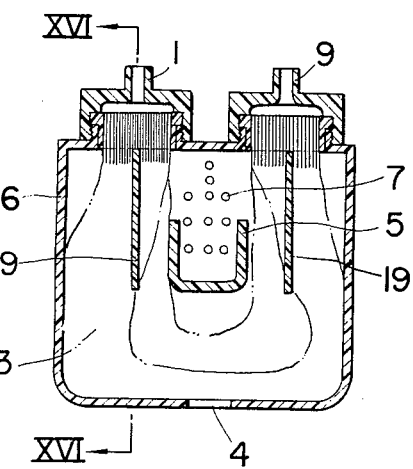
FIG. 15 is a view showing the longitudinal section of the apparatus of FIG. 14.
Figure 16:
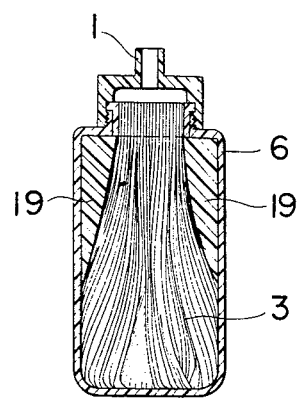
FIG. 16 is a sectional view taken along the line XVI—XVI in FIG. 15.

In each of the FIGS. 14 to 16, reference numeral 19 denotes a baffle board. The baffle board 19 is substantially perpendicular to the vertical section taken along the line connecting the centers of the two spaced-apart openings of the vessel and is on a plane traversing the center of said spaced-apart opening. As is shown in FIGS. 14 and 16, the baffle board 19 is contacted with the peripheral portion of the bundle of hollow fibers. At least two baffle boards 19 per opening are hung from the top face of the vessel along both sides of the bundle of the hollow fibers. Since the baffle boards 19 are disposed to improve the permeation state of the outside liquid at the gathered portion of the fiber bundle, they need not be extended to the lower portion of the vessel 6.

Figure 3:
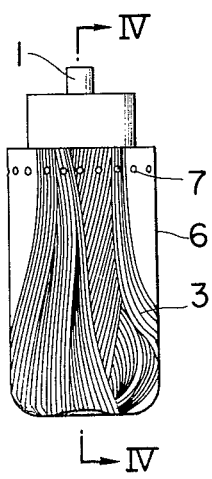
FIG. 3 is a side view of the apparatus shown in FIG. 1.

When an apparatus shown in FIGS. 1 to 4, 7 to 11 or 14 to 16, for example an apparatus shown in FIG. 3, is constructed, two parts of the vessel 6 divided along the line IV-IV can be molded separately, and thereafter a bundle of hollow fibers as shown in FIG. 5 is placed in the parts of the vessel 6. Two parts of the vessel 6 are bonded together, whereby the assembly operation can be greatly facilitated.

As is apparent from the foregoing illustration of the apparatus of this invention, the substantially U-shaped passage for the outside liquid may have either a completely U-shaped configuration as shown in FIG. 8 or a substantially U-shaped configuration such as shown in FIGS. 1, 7 and 9. In any event, however, it is important that the substantially U-shaped passage should be formed so that the inside liquid flows through this passage. The vertical portion of the U-shape of the passage need not be completely vertical but it may be inclined by up to about 30° from the vertical direction. However, better results are obtained when the vertical portion of the passage is completely vertical. It is important that the lower portion of the U-shape of the inner wall of the substantially U-shaped passage should have a radius of curvature larger than 20 cm, and better results are obtained when said curved lower portion is in substantially horizontal alignment. If the U-shaped passage is curved with a radius smaller than that defined by the above curvature, the length of the lower horizontal portion of the bundle which most readily receives the action of the outside liquid is shortened and good results are not obtained. More specifically, in the U-shaped bundle of hollow fibers suspended in the U-shaped passage of the vessel, it is preferred that the substantially horizontal lower portion of the U-shaped occupies 1/4 to 1/2, preferably about 1/3, of the effective fiber length.

The hollow fibers that can be used in this invention include not only cellulose acetate fibers, rayon fibers, polyacrylonitrile fibers etc. disclosed in Japanese Patent Publication No. 28625/64 but also any of other fibers having semi-permeable characteristics, and suitable kinds of fibers are chosen depending on the intended use of the apparatus. Use of hollow fibers having semi-permeable characteristics even in the dry state and having sufficient mechanical strength is especially preferred. As fibers which have such preferred characteristics and which are non-toxic or harmless when contacted with blood when used as an artificial kidney, there can be mentioned rayon hollow fibers prepared by the cuprammonium process. The outer diameter, length and number of the hollow fibers are not particularly critical, but in general, better results are obtained when 2,000 to 20,000 hollow fibers having an outer diameter not exceeding 1,500 $\mu$ and a length of 100 to 600 mm are employed. When the fiber diameter exceeds 1,500 $\mu$ the membrane area per unit volume is decreased and high efficiency can not be obtained. Further, if the velocity of flow of the outside liquid is increased, the hollow fibers are crushed and the resistance to flow of the inside liquid is increased which restricts the flow of the inside liquid. When the fiber length is too short, satisfactory effects cannot be attained, and when the fiber length is too long, the size of the apparatus must be increased and the operational efficiency is lowered. When the number of the hollow fibers is less than 2,000, satisfactory effects cannot be obtained, and when the number of the hollow fibers is greater than 20,000, uniform distribution of the inside liquid cannot be attained and there is insufficient contact between the outside liquid and the fibers. Accordingly, if the diameter, length and number of the hollow fibers are outside the above-mentioned preferred ranges, the intended effect of this invention cannot be sufficiently attained.

When the apparatus of this invention is used as an artificial kidney for the dialysis of blood, various limitations are imposed by the viscosity of blood, the coagulating property of blood, the allowable amount of blood to be taken out from the body of a patient (in general, about 300 ml), the pressure loss by the flow resistance on blood and the like, and in this case, it is preferred that 4,000 to 15,000 of hollow fibers having an outer diameter of 100 to 600 $\mu$ and a length of 200 to 600 mm are used in the form of a bundle.

The membrane thickness of the hollow fibers suitably adopted for attaining most of the objects of this invention is within a range of from 10 to 50 $\mu$, but hollow fibers having a membrane thickness outside this range may also be used as far as they have semi-permeable characteristics. In some cases, different kinds of fibers or fibers differing in outer diameter may be used in combination, but when the apparatus of this invention is used as an artificial kidney for the dialysis of blood, in order to flow blood uniformly, it is preferred to use hollow fibers substantially equal in chamber diameter.

As the adhesive to be used for formation of fixation blocks at both end portions of the bundle of hollow fibers, there can be employed epoxy resins, polyurethane resins, silicone resins, phenol-aldehyde resins, thermosetting synthetic rubbers, acrylic resins and other organic adhesives. A suitable kind of adhesive is chosen depending on the kind of the hollow fiber and the intended use of the apparatus. An epoxy resin is generally resistant to the corrosive activity of a solvent or chemical corrosion and is effective in providing a liquid tight condition forming liquid-tight blocks under pressure and temperatue conditions customarily used. Accordingly, the use of such an epoxy resin as an adhesive is especially preferred. When the apparatus of the invention is used as an artificial kidney, since the fixation blocks as well as other portions of the bundle of hollow fibers are in contact with blood, it is necessary to use an adhesive having no tendency to coagulate blood and no toxicity even when in contact with blood. As the adhesive suitable for this purpose, there can be mentioned, for example, silicone resins and urethane resins. In any event, the adhesive to be used should have such a property that it bonds the fibers in liquid tight condition to form fixation blocks whereby mingling or contact of the inside liquid and outside liquid is prevented.

A bundle of hollow fibers having fixation blocks at both end portions thereof may be prepared not only by the method disclosed in Japanese Patent Publication No. 28625/64 but also by other suitable method. In preparing the fiber bundle, care should be taken so that hollow chambers of the fibers are not crushed or filled with an adhesive to prevent liquid from flowing through the hollow chambers of the fibers.

The two openings positioned on the top face of the vessel may be spaced from each other only by a minimum distance allowing for the formation of a U-shaped passage for the outside liquid, but it is generally preferred that an appropriate distance larger than the above minimum distance is provided between the two openings, as illustrated in FIG. 9. A necessary number of discharge openings for the outside liquid may be positioned at necessary points in the vessel, but it is indispensable that they should be disposed at such positions as will attain a sufficient contact between the outside liquid introduced from the introduction opening and the hollow fibers, namely on the top face or the upper portion of the side face of the vessel.

As is seen from FIGS. 4, 7, 8 and 10, the inner side wall 5 of the outside liquid passage in the vessel is not disposed at such a position that the lower portion of the inner side wall is not closely contacted with the entire of the fiber bundle when no liquid is filled in the vessel. It is preferred that, as is shown in FIG. 9, the inner wall be arranged in such a position that the lower horizontal portion thereof restricts appropriately the expansion of the bundle of the hollow fibers when the outside liquid is introduced into the apparatus. It is also preferred that the inner side wall be arranged at such a position that an appropriate contact between the vertical portion of the inner side wall and the bundle of the hollow fibers is attainable. When the vertical portion of the inner side wall has too close a contact with the hollow fibers, the resistance to flow of the inside liquid is increased and contact between the outside liquid and the hollow fibers is reduced; therefore, the contact effect is lowered. When the inner side wall is diposed in such a position that the vertical portion thereof has no contact with the hollow fibers at all, the outside liquid flows only in portions where no fibers are present and the flow resistance is low, and therefore, the contact effect is also lowered.

The U-shaped outer side wall of the outside liquid passage in the vessel is preferably disposed in such a position that the expansion of the fiber bundle is appropriately restricted. The same holds true also with respect to the lateral width of the vessel. More specifically when as is illustrated in FIGS. 3 and 11, the lateral width of the vessel is so arranged that the vessel wall has an appropriate contact with the lower portion of the hollow fiber bundle to restrict appropriately the expansion of the fiber bundle, especially good results can be obtained. When in the lower horizontal portion of the substantially U-shaped passage for the outside liquid the fiber bundle is so arranged that the hollow fibers are more densely packed than at the lower part of said lower horizontal portion of the passage as shown in FIGS. 4, 7, 8 and 10, better results are generally obtained.

When the apparatus of this invention is used as an artificial kidney for cleaning of blood, because an inlet and an outlet for introduction and discharge of the inside liquid (blood in this case) are disposed at terminal ends of the fiber bundle where hollow fibers are closely gathered, the apparatus can be made compact, and the pressure loss by the flow resistance on blood and the amount of blood filled in said both end portions can be reduced.

As is apparent from the foregoing illustration, in the apparatus of this invention, since hollow fibers are suspended in a vessel, the flow rate of the outside liquid can be drastically increased and a sufficient contact can be attained between the hollow fibers and the outside liquid even if the flow rate of the outside liquid is increased. As a result, in the apparatus of this invention, the treatment time can be drastically shortened as compared with a conventional apparatus of the heat exchanger type, while maintaining the treatment efficiency at a higher level. Further, the size of the apparatus of this invention can be made much smaller than that of the conventional apparatus, when compared based on the same treatment efficiency.

When the apparatus of this invention is used as an artificial kidney, the dialysis time can be drastically shortened and the size of the apparatus of this invention can be made smaller than that of the conventional apparatus, when compared based on the same dialysis efficiency. Further, the amount of blood contained in the apparatus can be reduced, and hence, the burden on a patient can be reduced.

The effects attained by this invention will now be illustrated more specifically by reference to the following Examples.

EXAMPLE 1

A liquid treatment apparatus as shown in FIGS. 1 to 4 was prepared by using 8,000 of cellulose hollow fibers prepared according to the cuprammonium process and having an inner diameter of 260 $\mu$, an outer diameter of 300 $\mu$ and a length of 350 mm. A solution prepared by dissolving urea in distilled water so that the urea concentration was 1 mg/ml was passed through the interiors of the hollow fibers at a flow rate of 200 ml/min.

While a commercially available dialyzate [formed by diluting Renasole Solution (trademark of an undiluted dialyzate comprising sodium, potassium, chlorine, magnesium, calcium and glucose, manufactured and sold by Midori Juji) 35 times with distilled water] was circulated, a fresh treating liquid was supplied at a flow rate of 500 ml/min outside the hollow fibers and the dialyzate was discharged at the same flow rate. The dialysis was conducted at 37° C. The urea removal rate as determined with respect to the urea solution sampled at the urea solution outlet when 5 minutes had passed from the start of the experiment was found to be 82%. The amount of the liquid flowing in the hollow fibers and resident in the apparatus was about 150 ml and the effective surface area of the hollow fibers was about 2.0 m$^2$.

EXAMPLE 2

The dialysis was conducted in the same manner as in Example 1 except that baffle boards as shown in FIG. 14 were provided in the same treatment apparatus as used in Example 1. The urea removal rate as determined with respect to the urea solution sampled at the urea solution outlet when 5 minutes had elapsed from the start of the experiment was found to be 84%.

EXAMPLE 3

A liquid treatment apparatus as shown in FIGS. 10 to 11 was prepared by using 8,000 of cellulose hollow fibers prepared by the cuprammonium process and having an inner diameter of 260 $\mu$, an outer diameter of 300 $\mu$ and a length of 350 mm, and this treatment apparatus was used as an artificial kidney and arterial blood of a male of an age of 31 years was caused to flow into the apparatus at a flow rate of 250 ml/min. A dialyzate prepared by diluting Renasole Solution (trademark of an undiluted dialyzate sold by Midori Juji) 35 times with city running water was circulated outside the hollow fibers at a flow rate of 500 ml/min, and the dialyzate was discharged at the same rate. When the treatment was conducted for 4 hours, the urea concentration in blood, which had been 102 mg/dl before the dialysis, was lowered to 37 mg/dl. 2.2 kg of water could be removed at a venous pressure of 200 mm Hg. The condition of the patient was good during and after the dialysis.

What is claimed is:
1. A liquid treatment apparatus which comprises
 a. a vessel having a top and bottom face connected by a sidewall structure,
  1. said top face having two spaced-apart openings,
  2. said bottom face having at least one opening for introducing an outside flowing liquid,
  3. an upper portion of said vessel, including said top face and part of said sidewall structure, having a plurality of openings for discharging said outside flowing liquid,
  4. the interior of said vessel including a U-shaped passage, the terminal ends of which terminate at said two spaced-apart openings, respectively;
 b. a bundle of semi-permeable hollow fibers substantially equal in length suspended within said U-shaped passage and occupying only a portion thereof,
  1. one of the end portions of the bundle of fibers being gathered and bonded in a liquid tight connection to form a first fixation block and the other of the end portions of the bundle of fibers being gathered and bonded in a liquid tight connection to form a second fixation block, said first and second fixation blocks being fixed to said vessel, in liquid tight connection, at said two spaced-apart openings, respectively,
  2. the unbonded portion of the bundle of fibers being suspended in a manner for permitting free expansion upon contact with said outside flowing liquid, thereby permitting the outside flowing liquid to flow freely between the unbonded portions of the individual fibers and providing intimate contact between the surface of the fibers and the outside flowing liquid; and
 c. an inlet and an outlet for introducing and discharging an inside flowing liquid, arranged in an adjacent relationship with said two spaced-apart openings of the vessel and communicating with the terminal ends of the bundle of the fibers, respectively, thereby permitting the inside flowing liquid to flow through the interior of the individual hollow fibers.
2. A liquid treatment apparatus as set forth in claim 1 wherein a U-shaped partition plate is disposed in the interior of the vessel.
3. A liquid treatment apparatus as set forth in claim 1 wherein the vessel has a U-shaped configuration.
4. A liquid treatment apparatus as set forth in claim 1 wherein baffle board hung from the top face of the vessel along both sides of the bundle of the hollow fibers is disposed on the inside of the side walls of the vessel so that said baffle board is perpendicular to the vertical section taken along the line connecting the centers of said two spaced-apart openings and is on a plane transversing of said spaced-apart opening.
5. A liquid treatment apparatus as set forth in claim 1 wherein the introduction opening for the liquid flowing outside hollow fibers is disposed at the center of the bottom face of the vessel.
6. A liquid treatment apparatus as set forth in claim 1 wherein the introduction opening for the liquid flowing outside hollow fibers has means connecting said introduction opening to a liquid feed opening.
7. A liquid treatment apparatus as set forth in claim 1 wherein the hollow fibers are rayon hollow fibers prepared by the cuprammonium process.
8. A liquid treatment apparatus as set forth in claim 1 wherein the hollow fibers are composed of cellulose acetate.
9. A liquid treatment apparatus as set forth in claim 1 wherein the hollow fibers are composed of an acrylonitrile type polymer.
10. A liquid treatment apparatus as set forth in claim 1 wherein the hollow fibers have an outer diameter of 100 to 1,500 $\mu$.
11. A liquid treatment apparatus as set forth in claim 1 wherein the hollow fibers have an outer diameter of 100 to 600 $\mu$, said apparatus being used for dialysis of blood.
12. A liquid treatment apparatus as set forth in claim 1 wherein the hollow fibers are bonded to one another at both end portions thereof with an epoxy resin.
13. A liquid treatment apparatus as set forth in claim 1 wherein the hollow fibers are bonded to one another at both end portions thereof with a urethane resin.
14. A liquid treatment apparatus as set forth in claim 1 wherein the hollow fibers are bonded to one another at both end portions thereof with a silicone resin.

* * * * *